United States Patent [19]

Grünbauer et al.

[11] Patent Number: 4,972,003

[45] Date of Patent: Nov. 20, 1990

[54] FOAMING SYSTEM FOR RIGID URETHANE AND ISOCYANURATE FOAMS

[75] Inventors: Henri J. M. Grünbauer, Oostburg, Netherlands; Guido F. Smits, Wijengem, Belgium

[73] Assignee: The Dow Chemical Company, Midland, Mich.

[21] Appl. No.: 350,174

[22] Filed: May 10, 1989

[51] Int. Cl.$^5$ ............................................. C08G 18/14
[52] U.S. Cl. ............................... 521/131; 252/182.15; 252/182.24
[58] Field of Search ................. 521/131; 252/182.15, 252/182.24

[56] References Cited

U.S. PATENT DOCUMENTS 3,391,093 7/1968 Frost ..................................... 260/2.5
4,636,529 1/1987 Crooker .............................. 521/131

Primary Examiner—Maurice J. Welsh

[57] ABSTRACT

This invention relates to a process for preparing a rigid, closed-celled polyisocyanate-based foam in the presence of a blowing agent composition. The blowing agent composition comprises one or more organic compounds, particularly halocarbons, having a boiling point of less than or equal to 272K at atmospheric pressure, and further is substantially free of organic compounds having a boiling point of 273K or greater. Preferred halocarbons are chlorofluoroethanes and fluoroethanes.

11 Claims, No Drawings

FOAMING SYSTEM FOR RIGID URETHANE AND ISOCYANURATE FOAMS

Background of the Invention

This invention relates to rigid, closed-celled polyisocyanate-based foam, particularly polyurethane, polyurethane-isocyanurate and polyurethane-urea foams prepared using blowing agents which are organic compounds, particularly halocarbons.

It is well-known to prepare such polyurethane foams by reacting an organic polyisocyanate (including diisocyanates) with an active hydrogen-containing compound in the presence of a blowing agent or agents. Generally speaking, such blowing agents are volatile organic compounds which are liquid at room temperature. Such blowing agents are generally inert compounds that do not decompose or react during the polymerization reaction. The polymerization reaction is exothermic. The reaction exotherm is sufficient to vaporize the blowing agent, which then becomes encapsulated in the liquid phase of the polymerizing reaction mixture resulting in the formation of cells. The formation of cells causes the reaction mixture to expand and form a foam which subsequently cures to become a rigid closed-celled polyurethane foam.

Alternatively, it is also well-known to prepare foams with a combination of a liquid blowing agent and small amounts of a blowing agent precursor. A blowing agent precursor is a substance which reacts chemically with the polymerizing reaction mixture, or decomposes thermally as a result of exposure to, for example the reaction exotherm, generating "in situ" a gas. The generated gas functions as additional blowing agent in preparing the foam. A commonly used blowing agent precursor is water, which when reacted with isocyanate provides gaseous carbon dioxide.

Water is frequently used alone in the preparation of open-celled flexible polyurethane foams, but has found little value when used alone in the preparation of rigid, closed-celled foams. Frequently, when water is used alone to prepare rigid foams the resulting products display a high degree of friability, poor compressive strengths, high open-cell content and commercially unattractive thermal insulation properties. In addition, the use of water has not been economically interesting due to the greatly increased consumption of costly isocyanate.

In a recent patent application titled "New Polyether Polyol Formulations for Hard CFC Replacement by Water Blowing in Rigid Polyurethane Foams" filed on Dec. 7, 1988, Ser. No. 280,860, a process is disclosed wherein significant quantities of water in a formulation in combination with a liquid blowing agent is employed to prepare foam. The process provides for foam with commercially interesting physical properties. However, it is desirable to improve on these physical properties, such as, for example, dimensional stability and flowability.

It is therefore an objective of this invention to provide a process for preparing rigid, closed-celled polyisocyanate-based foams with improved physical properties by the use of blowing agents which are normally gases at ambient temperature.

Summary of the Invention

In one aspect, this invention is a process for preparing a rigid, closed-celled polyisocyanate-based foam which comprises contacting an organic polyisocyanate with an active hydrogen-containing compound in the presence of a blowing agent composition, characterized in that the blowing agent composition comprises one or more organic compounds having a boiling point less than or equal to about 272K, and wherein the blowing agent composition is substantially free of an organic compound having a boiling point of 273K or greater.

In a second aspect, this invention is an isocyanate reactive composition which comprises
(a) at least one active hydrogen-containing compound, and
(b) from about 1 to about 25 percent by total weight of (a) and (b) of a blowing agent composition, characterized in that the blowing agent composition comprises one or more organic compounds having a boiling point less than or equal to about 272K, and wherein the blowing agent composition is substantially free of an organic compound having a boiling point of 273K or greater.

In a third aspect, this invention is a rigid, closed-celled polyisocyanate-based foam prepared by contacting an organic polyisocyanate with an active hydrogen-containing compound in the presence of a blowing agent composition characterized in that the so-prepared foam contains within its cells a gaseous mixture comprising
(a) from about 5 to about 75 mole percent based on total moles of (a) and (b) of one or more organic compounds having a boiling point of less than or equal to 272K, and
(b) from about 25 to about 95 mole percent based on total moles of (a) and (b) of a gas generated from a blowing agent precursor,
and is substantially free of an organic compound having a boiling point of 273K or greater.

Surprisingly this invention allows for the preparation of rigid, closed-celled, polyisocyanate-based foams in the absence of blowing agents which are liquid at ambient room temperature. Employing blowing agents with atmospheric boiling points of 272K or less provides foams which exhibit commercially interesting physical properties including improved dimensional stability, when compared to foams prepared where the blowing agents are liquid at ambient temperature.

Detailed Description of the Invention

As described herein above, in one aspect this invention is a process for preparing rigid, closed-celled polyisocyanate-based foam in the presence of a blowing agent composition.

The blowing agent composition is characterized in that it comprises at least one organic compound having a boiling point at atmospheric pressure of less than or equal to about 272K, and preferably less than or equal to about 266K. Preferably the organic compound has a boiling point at atmospheric pressure of at least 222K, more preferably at least 235K and most preferably at least 252K.

The blowing agent composition is further characterized in that it is substantially free of organic compounds having boiling points of at least 273K or greater, preferably at least 267K or greater. By "substantially free" it is understood that the boiling agent composition contains less than 5 percent by weight of its total weight, of such high boiling organic compounds. Preferably, such high boiling organic compounds are present in less than about 3, more preferably less than about 1 percent by weight and most preferably are absent from the blowing agent composition.

Organic compounds which are suitable for use in this invention are those which are essentially inert under the conditions employed when preparing a polyurethane foam, but have boiling points of such that they are readily volatilized by the reaction exotherm. Typically, such organic compounds are hydrocarbons including alkanes, alkenes, cycloalkanes and cycloalkenes: alkyl alkanoates such as methyl formate; and halocarbons. To provide polyurethane foam with commercially interesting insulation properties, the organic compounds when in a gaseous phase advantageously exhibit gas thermal conductivities of less than about 20, preferably less than about 15, more preferably less than about 13 and most preferably less than about 12 mW/MK at 298K.

The preferred organic compounds are halocarbons. The halocarbons can be a halogenated hydrocarbon where the hydrocarbon is methane, ethane, propane, ethylene, propylene or cyclic alkane. Such halogenated hydrocarbons can be a chlorocarbon, a bromocarbon, a fluorocarbon, a chlorofluorocarbon or a bromofluorocarbon. In a more preferred embodiment of this invention, the halocarbon compounds contain at least one hydrogen atom on their carbon backbone. The presence of such a hydrogen atom renders the halocarbon more readily degradable in the environment thus preventing the large accumulation of such compounds. When the halocarbon contains no hydrogen on the carbon backbone, it is termed a "hard" halocarbon. When hydrogen is present, the halocarbon is termed a "soft" halocarbon.

The preferred halocarbons for use in this present invention are the chlorofluorocarbons of methane, ethane and propane: the bromofluorocarbons of methane, ethane and propane: and the fluorocarbons of ethane and propane: or mixtures thereof. Especially preferred are the chlorofluoroethane and fluoroethane halocarbons due to their commercial availability and suitability for preparing polyisocyanate-based foam.

Exemplary of methane halocarbons are the chlorofluoromethanes including dichlorodifluoromethane (R-12 , difluorochloromethane R-22), chlorofluoromethane (R-31): the bromofluoromethanes including bromochlorodifluoromethane (R-12B1), and bromodifluoromethane (R-22B1).

Exemplary of ethane halocarbons are the chlorofluoroethanes including chloropentafluoroethane (R-115), chlorotetrafluoroethane (R-124 or isomer R-124a), and chlorodifluoroethane (R-142b): the fluoroethanes including tetrafluoroethane (R-134 or isomer R-134a), trifluoroethane (R-143), difluoroethane (R-152a) and fluoroethane (R-161).

Exemplary of propane halocarbons are chloroheptafluoropropane (R-217),and the fluoropropanes including octafluoropropane (R-218), heptafluoropropane (R-227a), hexafluoropropane (R-236), and pentafluoropropane (R-245d).

Exemplary of ethylene and propylene halocarbons are chlorotrifluoroethylene (R-1113), chlorodifluoroethylene (R-1122), trans-chlorofluoroethylene (R-1131), gem-chlorofluoroethylene (R-1131a), difluoroethylene R-1132) and chloroethylene R-1140), hexafluoropropylene (R-2116a), pentafluoropropylene (R-2125a), tetrafluoropropylene (R-2134a), and difluoropropylene (R-2152b). Exemplary of cyclic halocarbons are hexafluorocyclopropane (C-216) and octafluorocyclobutane (C-318).

The particularly preferred organic compounds for use in this present invention include chlorofluoromethane (R-31), bromodifluoromethane (R-22B1), chlorotetrafluoroethane (R-124 or isomer R-124a), chlorodifluoroethane (R-142b), tetrafluoroethane (R-134 or isomer R-134a), trifluoroethane (R-143), difluoroethane (R-152a) and fluoroethane (R-161), or mixtures thereof.

Especially preferred is chlorodifluoroethane (R-142b) and tetrafluoroethane (R-134 or isomer R-134a).

When preparing polyisocyanate-based foams by the process of this invention, optionally but desirably there is present a blowing agent precursor. The blowing agent precursor is a substance which during the course of the polymerization reaction provides a gas. The so-provided gas functions as an auxiliary blowing agent in addition to the blowing agent composition present.

The blowing agent precursor can provide the gas through chemical reaction with itself, one or more of the components or intermediates of the reacting mixture, or alternatively provide the gas as a result of thermal instability on exposure to the exotherm generated by the reaction.

Illustrative of such a blowing agent precursor is water, which reacts chemically with organic isocyanates leading to the production of carbon dioxide. Illustrative of blowing agent precursors which provide a gas through thermal instability are the amine/carbon dioxide complexes such as taught in U.S. Pat. Nos. 4,735,970 and 4,500,656, alkyl alkanoate as disclosed in U.S. Pat. No. 3,879,315, (all incorporated by reference) and pecan flour.

When a blowing agent precursor is present in the process of this invention preferably it is water, especially when the blowing agent composition comprises chlorodifluoroethane (R-142b) and/or tetrafluoroethane (R-134 or isomer R-134a).

Polyisooyanate-based foams are prepared by reacting at least one organic polyisocyanate with at least one active hydrogen-containing compound in the presence of the blowing agent composition described hereinabove.

The quantity of blowing agent composition employed when preparing a foam is sufficient to give a desired density to the foam. Advantageously, sufficient blowing agent is employed to provide a polyurethane foam having an overall density of from about 10 to about 500, preferably from about 15 to about 200, more preferably from about 18 to about 100 and most preferably from about 18 to about 60 kg/m$^3$.

It is often convenient to preblend the blowing agent composition with the active hydrogen-containing compound before contacting the resulting blend with the polyisocyanate. It is also possible to simultaneously blend together the polyisocyanate, active hydrogen-containing compound and blowing agent composition in one operation resulting in the production of polyisocyanate-based foam.

Preferably the blowing agent composition is blended with the active hydrogen-containing compound before contacting with the polyisocyanate. More preferably, the blowing agent composition is prepared within the active hydrogen-containing compound before contacting with the polyisocyanate.

An isocyanate reactive composition can be prepared by blending at least one active hydrogen-containing compound with the blowing agent composition. Advantageously, the blend contains at least one, preferably at least 2 and up to 25, preferably up to 20 and more preferably up to 15 weight percent of the blowing agent composition by total weight of active hydrogen-containing compound and blowing agent composition. Isocyanate reactive compositions containing the blowing agent composition in quantities outside these limits may not provide foam of the desired density. Advantageously, the active hydrogen-containing compound(s) used in preparing the isocyanate reactive composition has an equivalent weight of about 50 to about 700, preferably about 70 to about 300, more preferably about 90 to about 270. For reasons of solubility and retention of blowing agent in the isocyanate-reactive composition, it is desirable that at least one of the active hydrogen-containing compounds has an equivalent weight of at least 140.

Polyisocyanates useful in the process of this invention for making polyisocyanate-based foam include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate: triisocyanates such as toluene-2,4,6-triisocyanate and polyisocyanates such as 4,4'-dimethyldiphenylmethane-2,2',5,5'-tetraisocyanate and the diverse polymethylenepolyphenylpolyisocyanates.

A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates are disclosed in U.S. Pat. No. 3,215,652, incorporated by reference.

Especially preferred are methylene-bridged polyphenylpolyisocyanates, due to their ability to cross-link the polyurethane. The isocyanate index (ratio of equivalents of isocyanates to equivalents of active hydrogen-containing groups) is advantageously from about 0.9 to about 10, preferably about 1.0 to about 4.0, more preferably about 1.0 to about 1.5.

Active hydrogen-containing compounds which are useful in this present invention include those materials having two or more groups which contain an active hydrogen atom which reacts with an isocyanate, such as is described in U.S. Pat. No. 4,394,491, incorporated herein by reference. Preferred among such compounds are materials having at least two hydroxyl, primary or secondary amine, carboxylic acid, or thiol groups per molecule. Polyols, i.e., compounds having at least two hydroxyl groups per molecule, are especially preferred due to their desirable reactivity with polyisocyanates.

Suitable isocyanate reactive materials for preparing rigid polyisocyanate-based foams include those having an equivalent weight of about 50 to about 700, preferably about 70 to about 300, more preferably about 90 to about 270 and most preferably from about 140 to about 270. Such isocyanate-reactive materials also advantageously have a functionality of at least 2, preferably about 3, up to about 16, preferably up to about 8, active hydrogen atoms per molecule. Isocyanate reactive compounds which have functionalities and equivalent weights outside these limits may also be used, but the resulting foam properties may not be desirable for a rigid application.

Suitable additional isocyanate-reactive materials include polyether polyols, polyester polyols, polyhydroxy-terminated acetal resins, hydroxyl-terminated amines and polyamines, and the like. Examples of these and other suitable isocyanate-reactive materials are described more fully in U.S. Pat. No. 4,394,491, particularly in columns 3–5 thereof. Most preferred for preparing rigid foams, on the basis of performance, availability and cost, is a polyol prepared by adding an alkylene oxide to an initiator having from about 2 to about 8, preferably about 3 to about 8 active hydrogen atoms. Exemplary of such polyols include those commercially available under the trade name Voranol and include Voranol 202, Voranol 360, Voranol 370, Voranol 446, Voranol 490, Voranol 575, Voranol 800, all sold by The Dow Chemical Company, and Pluracol 824, sold by BASF Wyandotte.

Other most preferred polyols include alkylene oxide derivatives of Mannich condensates, as taught, for example, In U.S. Pat. Nos. 3,297,597; 4,137,265 and 4,383,102, incorporated herein by reference, and aminoalkylpiperazine-initiated polyethers as described in U.S. Pat. Nos. 4,704,410 and 4,704,411, incorporated herein by reference. And also the low hydroxyl number, high equivalent weight alkylene oxide adducts of carbohydrate initiators such as sucrose and sorbitol disclosed in a pending application titled "New Folyether Polyol Formulations for Hard CFC Replacement by Water Blowing in Rigid Polyurethane Foams" filed on Dec. 7, 1988, Ser. No. 280,860, and incorporated herein by reference.

In addition to the foregoing critical components, it is often desirable to employ certain other ingredients in preparing polyisocyanate-based foams. Among these additional ingredients are catalysts, surfactants, flame retardants, preservatives, colorants, antioxidants, reinforcing agents, fillers, antistatic agents and the like.

When preparing a polyisocyanate-based foam by the process of this invention it is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, about 0.2 to about 5 parts of the surfactant per 100 parts by weight polyol are sufficient for this purpose.

One or more catalysts for the reaction of the polyol (and water, if present) with the polyisocyanate are advantageously used. Any suitable urethane catalyst may be used, including tertiary amine compounds and organometallic compounds. Exemplary tertiary amine compounds include triethylenediamine, n-methyl morpholine, pentamethyldiethylenetriamine, tetramethylethylenediamine, 1-methyl-4-dimethylaminoethylpiperazine, 3-methoxy-N-dimethylpropylamine, N-ethyl morpholine, diethylethanolamine, N-coco morpholine, N,N-dimethyl-N',N'-dimethyl isopropylpropylenediamine, N,N-diethyl-3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, such as an alkali metal alkoxide, alkali metal carboxylate, or quaternary amine compound, may also optionally be employed herein. Such catalysts are used in an amount which measurably increases the rate of reaction of the polyisocyanate. Typical amounts are about 0.001 to about 1 part of catalyst per 100 parts by weight of polyol.

In the process of making a polyisocyanate-based foam, the polyol(s), polyisocyanate and other components are contacted, thoroughly mixed and permitted to expand and cure into a cellular polymer. The particulate mixing apparatus is not critical, and various types of mixing head and spray apparatus are conveniently used. It is often convenient, but not necessary, to preblend certain of the raw materials prior to reacting the polyisocyanate and active hydrogen-containing components. For example, it is often useful to blend the polyol(s), blowing agent, surfactants, catalysts and other components except for polyisocyanates, and then contact this mixture with the polyisocyanate. Alternatively, all components can be introduced individually to the mixing zone where the polyisooyanate and polyol(s) are contacted. It is also possible to pre-react all or a portion of the polyol(s) with the polyisocyanate to form a prepolymer, although such is not preferred.

As already mentioned, in one aspect this invention is a polyisocyanate-based foam. The rigid, closed-celled polyisocyanate-based foam can be prepared by contacting an organic polyisocyanate with an active hydrogen-containing compound in the presence of a blowing agent composition characterized in that the so-prepared foam contains within its cells a gaseous mixture comprising
(a) from about 5 to about 75 mole percent based on total moles of (a) and (b) of one or more organic compounds having a boiling point of less than or equal to 272K, and
(b) from about 25 to about 95 mole percent based on total moles of (a) and (b) of a gas generated from a blowing agent precursor,
and is substantially free of an organic compound having a boiling point of 273K or greater.

Component (a) of the gaseous mixture within the cells is present in from at least about 5, preferably at least about 15, and more preferably at least about 25, and up to about 75, preferably up to about 65, and more preferably up to about 55 mole percent based on total moles of (a) and (b) present.

Component (b) is a gas generated from a blowing agent precursor, and wherein the gas preferably is carbon dioxide. In a more preferred embodiment, the carbon dioxide is generated by the reaction of water with organic polyisocyanate. The gas is present in from at least about 25, preferably at least about 35, and more preferably at least about 45, and up to about 95, preferably up to about 85, and more preferably up to about 75 mole percent based on total moles of (a) and (b) present.

The cell gas mixture is further characterized in that it is substantially free of organic compounds having boiling points of at least 273K or greater, preferably at least 267K or greater. By "substantially free" it is understood that the gas mixture within the cell contains less than 5 mole percent by total moles of (a) and (b) present of such high boiling organic compounds. Preferably, such high boiling organic compounds are present in less than about 3, more preferably less than about 1 mole percent and most preferably are absent from the blowing agent composition.

The polyisocyanate-based foam of this invention is useful in a wide range of applications, such as in spray insulation, appliance foam, rigid insulating boardstock, laminates, and many other types of rigid foam.

Illustrative Embodiments

The following examples are given to illustrate the invention and should not be interpreted as limiting it in any way. Unless stated otherwise, all parts and percentages are given by weight.

Example 1

Rigid, closed-celled, polyisocyanate-based foams are prepared from the formulation described in Table I. The following abbreviations are used in the table.

Polyol A—a propoxylated sorbitol-initiated polyol having an equivalent weight of about 146

Polyol B—a propoxylated sorbitol-initiated polyol having an equivalent weight of about 187

Polyol C—a blend of propoxylated sucrose- and glycerine-initiated polyols, an ethylene-diamine-initiated polyol and a 500 equivalent weight diol. Total blend has an equivalent weight of 122, average functionality 4.0

Polyol D—a 500 equivalent weight propoxylated diol

B8427—Tegostab ® B8427, a silicone surfactant sold by Th. Goldschmidt

DMCHA—catalyst, dimethylcyclohexylamine

PMDETA—catalyst, pentamethyldiethylenetriamine

Curithane 206—catalyst, sold by The Dow Chemical Company

R-11; Refrigerant-11, trichlorofluoromethane

R-142b; Refrigerant-142b, chlorodifluoroethane

S0 C M220—a crude polymeric methanediphenylisocyanate NCO equivalent weight 137, average functionality sold by The Dow Chemical Foams are prepared using a Hennecke HK 100 foaming machine. The physical properties of these foams are shown in Table II.

The flowability, density distribution, compressive strength, thermal conductivity (K-factor) and dimensional stability is observed using molded foam prepared in a Brett mold operated at about 45° C. Mold dimensions are 200×20×5 cm. Molded foam having an overall density of about 32 kg/m³ is prepared.

Larger flowability values indicates better flowability of the foaming system. Lower values of density distribution indicate a more uniform density across the foam. K-factor is measured with an Anacon Model 88 Thermal Conductivity Analyzer with cold and hot plate temperatures of 10.2° C. and 37.8° C., respectively. Lower values of K-factor indicate better insulative properties.

Post demold expansion is measured in millimeters in the parallel-to-rise direction on 20×20×20 cm cube foam, molded to an overall density of about 30 kg/m³. The expansion is observed after a curing time of 10 minutes and then 24 hours, with one face of the mold having initially been opened after 3 or 4 minutes curing.

Lower values of expansion indicate improved demold performance.

(D) 110° C. is reported in Table III. The value noted in Table III are percentage volume change of 5×5×5 cm.

TABLE I

|  | A* | 1 | B* | 2 | C* | 3 | D* | 4 | 5 | 6 |
|---|---|---|---|---|---|---|---|---|---|---|
| Polyol A | 100 | 100 | — | — | — | — | — | — | — | — |
| Polyol B | — | — | 100 | 100 | — | — | — | — | — | — |
| Polyol C | — | — | — | — | 75.6 | 75.6 | 44.2 | 96.2 | 85.6 | 50.0 |
| Polyol D | — | — | — | — | 20.6 | 20.6 | 51.0 | — | 10.6 | 46.0 |
| B 8427 | 1.5 | 1.5 | 1.5 | 1.5 | 0.3 | 0.3 | 0.3 | 0.3 | 0.3 | 0.3 |
| DMCHA | 1.5 | 1.5 | 2.0 | 2.0 | 0.8 | 0.8 | 0.7 | 0.9 | 0.8 | 0.65 |
| PMDETA | 0.7 | 0.7 | 0.7 | 0.7 | 0.7 | 0.7 | 0.7 | 0.7 | 0.7 | 0.70 |
| Curithane 206 | — | — | — | — | 0.9 | 0.9 | 0.9 | 0.9 | 0.9 | 0.9 |
| Total Water | 3.66 | 3.66 | 3.27 | 3.27 | 3.16 | 3.16 | 5.7 | 1.8 | 2.86 | 5.5 |
| R-11 | 18.6 | — | 16.6 | — | 22 | — | — | — | — | — |
| R-142b | — | 16.41 | — | 15.0 | — | 15.6 | — | 26.5 | 13.25 | 2.2 |
| ISO C M220 | 155.8 | 155.8 | 128.9 | 128.9 | 157 | 157 | 170.9 | 153.6 | 161.7 | 169.9 |

TABLE II

|  | A* | 1 | B* | 2 | C* | 3 | D* | 4 | 5 | 6 |
|---|---|---|---|---|---|---|---|---|---|---|
| Theoretical cell gas composition (Mole %) | | | | | | | | | | |
| R-142b | — | 44.5 | — | 45.1 | — | 46.8 | — | 72.5 | 45.3 | 7% |
| $CO_2$ | — | 55.5 | — | 54.9 | — | 53.2 | 100% | 27.5 | 54.7 | 93% |
| Reactivity (secs) | | | | | | | | | | |
| cream time | 5 | — | 4 | — | 4 | — | 7 | — | — | 6 |
| gel time | 35 | 37 | 30 | 37 | 40 | 39 | 38 | 42 | 40 | 39 |
| tack free time | 66 | 76 | 60 | 70 | 65 | 65 | 60 | 68 | 70 | 60 |
| Free-rise density (Kg/M$^3$) | 23.0 | 21.3 | 23.1 | 21.2 | 22.3 | 22.2 | 22.2 | 22.3 | 22.7 | 22.5 |
| Density Distribution | 0.88 | 1.10 | 1.56 | 0.80 | 0.57 | 0.42 | 0.22 | 1.96 | 0.42 | 0.22 |
| Flowability (M/Kg) | 3.49 | 3.63 | 3.33 | 3.71 | 3.62 | 3.71 | 3.37 | 3.27 | 3.32 | 3.33 |
| Post Demold Expansion (mm) (molded density) (30 Kg/M$^3$) | | | | | | | | | | |
| 3 min/10 min | 3.5 | 8.45 | 2.2 | 9.2 | 8.0 | 8.2 | 5.10 | 5.75 | 5.5 | 1.2 |
| 3 min/24 hr | −1.0 | 6.8 | −8.8 | 7.15 | 4.4 | 5.75 | −5.2 | 2.7 | 2.5 | −3.0 |
| 4 min/10 min | — | 5.9 | — | 5.3 | 6.35 | 6.4 | 2.5 | 3.95 | 3.7 | 0.5 |
| 4 min/24 hr | — | 4.2 | — | 3.1 | 3.0 | 3.75 | −6.6 | 0.7 | −2.2 | −2.5 |
| Comp. Strength (KPa) (⊥) | 111 | 117 | 68 | 124 | 123 | 130 | 150 | 140 | 169 | 125 |
| K-Factor(⊥) (mW/MK) | 21.2 | 22.8 | 22.5 | 22.1 | 20.0 | 22.3 | 25.2 | 23.6 | 22.1 | 25.0 |
| Dimensional Stability % vol change (70° C. 95% R.H) | −3.7 | +3.4 | −10.3 | +4.0 | +2.9 | +1.3 | −28.1 | +4.9 | +1.7 | −16.0 |

*Not an example of the invention
⊥perpendicular to rise direction

The dimensional stability of Examples 3 to 6 and Comparative Examples C and D has been extensively evaluated. Dimensional stability of the foams at (A) 20° C., (B) −30° C., (C) 70° C./95% relative humidity and (D) 110° C. cubes of foam.

The K-factor performance of Examples 3 to 6 and Comparative Examples C and D with respect to time is give in Table IV.

TABLE III

| | | \multicolumn{5}{c}{DIMENSIONAL STABILITY} | | | | |
|---|---|---|---|---|---|---|
| | | 1 day | 7 days | 14 days | 21 days | 28 days |
| Example C* | A | 0 | −0.7 | −1.7 | −3.7 | −4.0 |
| | B | −0.2 | −0.9 | −0.8 | −1.1 | 1.8 |
| | C | +2.9 | +3.3 | +3.6 | +4.2 | +5.1 |
| | D | +0.5 | +6.9 | +9.5 | +10.8 | +11.2 |
| Example 3 | A | −0.3 | −1.0 | −1.4 | −1.0 | −1.7 |
| | B | +0.2 | −0.5 | −0.7 | −1.1 | −1.4 |
| | C | +2.8 | +2.5 | +2.8 | +2.9 | +3.5 |
| | D | +0.5 | +2.5 | +5.6 | +6.6 | +6.9 |
| Example 4 | A | −0.2 | 0 | −0.3 | −0.1 | 0 |
| | B | +0.3 | +0.6 | 0 | 0 | −0.6 |
| | C | +4.9 | +5.3 | +5.9 | +6.3 | +6.5 |
| | D | +0.9 | +2.6 | +3.8 | +4.8 | +6.6 |
| Example 5 | A | −0.6 | −0.4 | −0.9 | −1.0 | −1.0 |
| | B | 0 | +0.45 | +0.1 | +0.1 | −0.4 |
| | C | +1.7 | +1.5 | +2.0 | +2.6 | +3.1 |
| | D | +0.5 | +2.2 | +4.0 | +5.7 | +7.0 |
| Example 6 | A | −3.5 | −3.8 | — | — | — |
| | B | −0.5 | −1.1 | — | — | — |
| | C | −16.0 | −22.7 | — | — | — |
| | D | −14.6 | −18.2 | — | — | — |
| Example D* | A | −1.2 | −2.2 | −4.0 | −5.6 | −6.0 |
| | B | −0.7 | −0.6 | −0.9 | −1.3 | −2.0 |
| | C | −28.1 | −24.9 | −23.6 | −18.2 | −18.7 |

TABLE III-continued

| | DIMENSIONAL STABILITY | | | | |
| --- | --- | --- | --- | --- | --- |
| | 1 day | 7 days | 14 days | 21 days | 28 days |
| D | −21.7 | −14.7 | −15.1 | −15.0 | −14.7 |

*Not an example of this invention

TABLE IV

| | K-FACTOR AGING IN MW/M° K | | | | | |
| --- | --- | --- | --- | --- | --- | --- |
| | 1 day | 7 days | 14 days | 21 days | 28 days | 35 days |
| Example C* | 20.0 | 20.1 | 20.1 | 20.4 | 21.0 | 21.3 |
| Example 3 | 22.3 | 22.9 | 23.1 | 23.5 | 24.3 | 24.7 |
| Example 4 | 23.6 | 24.0 | 24.4 | 24.8 | 25.2 | 25.5 |
| Example 5 | 22.1 | 22.5 | 22.7 | 22.8 | 23.1 | 23.3 |
| Example 6 | 25.0 | NO | 30.8 | — | — | — |
| Example D* | 25.2 | 28.2 | 30.4 | 32.6 | 33.5 | 33.7 |

*Not an example of this invention
NO - not observed

As can be seen from the data in Tables II to IV, foam with acceptable physical properties can be produced according to this invention. The use of blowing agents having an ambient boiling point, greater than 273K, such as the hard CFC trichlorofluoromethane (R-11) can be avoided in the preparation of foam. Improvements in comprehensive strength and demold performance are obtainable. Particularly, significant is the improvement in overall dimensional stability of foams when prepared according to this invention.

What is claimed is:

1. A process for preparing a rigid closed-celled polyisocyanate based foam which comprises contacting under reaction conditions an organic polyisocyanate with a hydroxyl-terminated alkylene oxide adduct in the presence of a blowing agent which consists of one or more chlorofluorobromofluoro-, or fluoro-, -ethane, or -propane compounds or mixtures thereof having a boiling point of from 235K to about 27K and in the presence of a blowing agent precursor and wherein the blowing agent is substantially free of an organic compound having a boiling point of 273K or greater.

2. The process of claim 1 wherein the blowing agent is a chlorofluoroethane or fluoroethane or mixtures thereof.

3. The process of claim 2 wherein the chlorofluoroethane is selected from the group consisting of chlorotetrafluoroethane (R-124 or isomer R-124a) and chlorofluoroethane (R-142b) or mixtures thereof.

4. The process of claim 3 wherein the chlorofluoroethane is chlorodifluoroethane (R-142b).

5. The process of claim 2 wherein the fluoroethane is one or more selected from the group consisting of tetrafluoroethane (R-134 or isomer R-134a), trifluoroethane (R-143), difluoroethane (R-152a) and fluoroethane (R-161).

6. The process of claim 5 wherein the fluoroethane is tetrafluoroethane (R-134 or isomer R-134a).

7. The process of claim 1 wherein the blowing agent precursor is water.

8. The process of claim 7 wherein the chlorofluoroethane is chlorodifluoroethane (R-142b).

9. The process of claim 7 wherein the fluoroethane is tetrafluoroethane (R-134 or isomer R-134a).

10. An isocyanate reactive composition which comprises
    (a) at least one hydroxyl-terminated alkylene oxide adduct, and
    (b) from about 1 to 25 percent by total weight of (a) and (b) of a blowing agent composition characterized in that the blowing agent composition consists of one or more chlorofluoro-, bromofluoro-, or fluoro-, -ethane, or -propane compounds or mixtures thereof having a boiling point of from 235K to about 272K and a blowing agent precursor, and wherein the blowing agent composition is substantially free of an organic compound having a boiling point of 273K or greater.

11. A rigid closed-celled polyisocyanate-based foam prepared by contacting an organic polyisocyanate with a hydroxyl-terminated alkylene oxide adduct compound in the presence of a blowing agent composition characterized in that the so-prepared foam contains within its cells a gaseous mixture comprising
    (a) from about 5 to about 75 mole percent based on total moles of (a) and (b) of one or more chlorofluoro-, bromofluoro-, or fluoro-, -ethane, -propane compounds having a boiling point of from 235K to about 272K, and
    (b) from about 25 to about 95 mole percent based on total moles of (a) and (b) of a gas generated from the blowing agent precursor,
and wherein the gaseous mixture is substantially free of an organic compound having a boiling point of 273K or greater.

* * * * *